United States Patent
Abney

[15] 3,661,392
[45] May 9, 1972

[54] ARITHMETIC CARDS AND GAME UTILIZING SUCH

[72] Inventor: Thomas M. Abney, 611-7th Street, Humble, Harris County, Tex. 77338

[22] Filed: Aug. 10, 1970

[21] Appl. No.: 62,335

[52] U.S. Cl. ............... 273/152.1, 35/31 G, 273/152.7 R
[51] Int. Cl. ............................................. A63f 1/02
[58] Field of Search ............ 35/31 G, 70, 71, 69, 31 C, 35/31 F; 273/152.1, 152.7 R

[56] References Cited

UNITED STATES PATENTS

| | | | |
|---|---|---|---|
| 1,598,450 | 8/1926 | Ritter | 35/31 G X |
| 1,699,629 | 1/1929 | Phifer | 35/31 G X |
| 1,766,465 | 6/1930 | Snelling | 35/31 G |
| 2,159,563 | 5/1939 | McNaney | 273/152.1 |

Primary Examiner—H. S. Skogquist
Attorney—Pravel, Wilson & Matthews

[57] ABSTRACT

A new and improved card specifies arithmetical relationships in a manner permitting a new and improved arithmetic game to be played for education or entertainment using a plurality of such cards.

5 Claims, 1 Drawing Figure

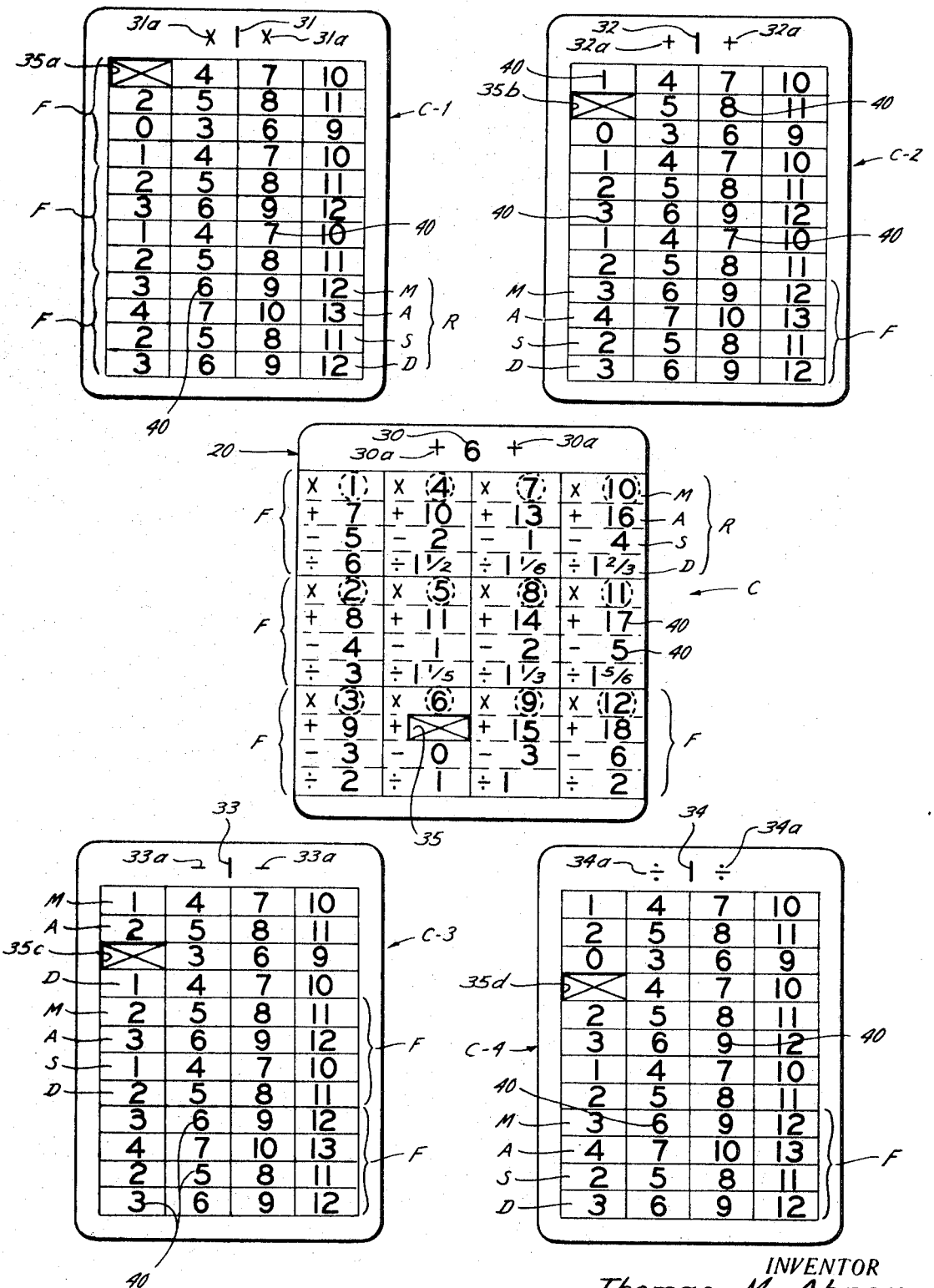

ARITHMETIC CARDS AND GAME UTILIZING SUCH

BACKGROUND OF THE INVENTION

1. Field of the Invention

The present invention relates to arithmetic cards and games utilizing such cards.

2. Description of the Prior Art

There is no known prior art to applicant's knowledge which relates to the arithmetic cards and game of the present invention.

SUMMARY OF THE INVENTION

Briefly, the present invention provides a plurality of arithmetic cards, each card being assigned to a value specified by an operator integer and an arithmetic operation, such as add, subtract, multiply and divide, performable by such particular integer upon a plurality of other, or operand, integers. A face of each playing card is divided into a plurality of fields, one field allocated for each of the integers. Each field is further divided into a plurality of regions, one region for the particular arithmetic operation performable by the operator integer upon the operand integer defined by such field, and bearing indicia specifying the result of such arithmetic operation, with other regions in each field bearing indicia specifying the result of other mathematical operations performable by the operator integer upon the operand integer of such field. An aperture is formed in each card at the location of the region and field for the particular operator integer and arithmetic operation assigned to such playing card.

The cards are adapted to play an arithmetic game for education or entertainment purposes in which the cards are dealt to a plurality of players. The players thereafter select a desired card from their hand and play such card. The score for a particular play is determined by the value of the card played and is indicated by the indicia visible through the aperture of the card played in such play, and the winner of the game is determined on the basis of total points accumulated during the play of the cards.

The cards may also be used as training aids in education, particularly in teaching arithmetic and the like.

It is an object of the present invention to provide a new and improved arithmetic card.

It is an object of the present invention to provide a new and improved arithmetic game for educational or entertainment purposes.

It is an object of the present invention to provide a new and improved training aid for teaching arithmetic.

BRIEF DESCRIPTION OF THE DRAWINGS

The accompanying sheet of drawings contains plan views of arithmetic cards of the present invention.

DESCRIPTION OF THE PREFERRED EMBODIMENT

In the drawing, the letter C refers generally to an arithmetic card of the present invention, which is used in the arithmetic game of the present invention for education and entertainment, as will be evident later.

A card 20, which may be made from plastic, cardboard, celluloid, heavy-duty paper or the like is divided into a plurality of information bearing segments or fields F, arranged in four columns of three fields F each, on one face of such card 20. The card 20 is assigned a value defined by an identifying operator integer "6" and mathematical operation "ADD" and bears an indication 30 of such integer and indications 30a of such mathematical operation.

Each of the fields F is allocated to an operand integer, as illustrated on the card 20 by the labelling integers "1" through "12" being each assigned one field F beginning at the upper leftmost field F and ending at the lower rightmost field F.

The labelling integers "1" through "12" are included on the card 20 for the purposes of illustration and do not appear on the arithmetic cards of the present invention in the positions shown, as will be evident later.

Each of the fields F includes a plurality of regions R, including an addition region A, a subtraction region S, a multiplication region M, and a division region D, each of which regions R contains an indicia 40 which may be a code, printing or the like, defining the result of a corresponding mathematical operation (add, subtract, multiply and divide, respectively) performed upon the operand integer of the field F by the operator integer portion of the value of such card. Thus, the multiplication regions M in the fields F on the card 20 bear indicia 40 defining the result of multiplying the operand integer of each of such fields F, as represented by each of the respective labelling integers "1" through "12," by the operator integer "6" assigned such card, or 6, 12, 18, 24, 30, 36, 42, 48, 54, 60, 66 and 72, respectively. Similarly, each of the addition regions A contains indicia 40 defining the result of adding the operator integer "6" of such card to the operand integers 1 through 12; the subtraction regions S contain indicia 40 defining the absolute value of the result of subtracting the operator integer 6 of such card from the operand integers 1 through 12; and the division region D contains indicia 40 defining the result of dividing the larger of either the operator integer or operand integer by the smaller of such integers. The division operation of dividing the smaller integer into the larger integer is preferably used, in order to reduce the number of cumbersome fractions in order to simplify scorekeeping for the game, as will be more evident later. However, the division region D may bear indicia 40 defining the result of dividing the operand integer by the operator integer to give the correct operational answer when the cards are used for education purposes.

An aperture or window 35 is formed in the location in the card C in the addition region A of the "6" field F, corresponding to the value of the card as identified by the operator integer 30 and the additive mathematical operation indicated by addition symbols 30a in order to play the mathematical game of the present invention.

Cards C-1, C-2, C-3 and C-4 further illustrate arithmetic cards of the present invention and include a "Multiply One" value card C-1 identified by indicators 31 and 31a, specifying an operator integer "1" and a multiplicative mathematical operation, respectively, and having an aperture 35a formed at the location of the multiplication region M of the field F for operator integer 1 of the value of the card, and bearing indicia 40 in each of the other regions R of the field F defining the result of the mathematical operation (add, subtract, multiply or divide) specified for such region when such operation is performed by the operator integer "1" indicated at 31 upon the operand integers 1 through 12, of such fields F.

The "Add One" value card C-2 is identified by indicators 32 and 32a specifying an operator integer "1" and an additive mathematical operation, respectively, and has an aperture 35b formed at the location of the addition region A of the field F for operator integer 1, and bears indicia 40 in each of the other regions R of the fields F defining the result of the mathematical operation (add, subtract, multiply or divide) specified for such region when such operation is performed by the operator integer "1" indicated at 32 upon the operand integers 1 through 12 of such fields F.

The "Subtract One" value card C-3 is identified by indicators 33 and 33a specifying an operator integer "1" and a subtractive mathematical operation, respectively, and has an aperture 35c formed at the location of the subtraction region S of the field F for operator integer 1, and bears indicia 40 in each of the other regions R of the fields F defining the result of the mathematical operation (add, subtract, multiply or divide) for such region when such operation is performed by the operator integer "1" indicated at 33 upon the operand integers 1 through 12 of such fields F.

The "Divide One" value card C-4 is identified by indicators 34 and 34a specifying an operator integer "1" and a divisive mathematical operation, respectively, and has an aperture 35d formed at the location of the division region D of the field F for operator integer 1, and bears indicia 40 in each of the other regions R of the fields F defining the result of the mathematical operation (add, subtract, multiply or divide) specified for such region when the operation is performed by the operator integer "1" indicated at 34 upon the operand integers 1 through 12 for such fields F.

In a like manner, arithmetic cards, assigned values defined by each of the other operator integers "2" to "12" and each of the mathematical operations defined by the regions R, are formed and have an aperture 35 formed in the region R allocated to the value assigned to the particular arithmetic card in the manner previously set forth.

In the operation of the invention, the players desiring to play the game, who may be two or more students learning basic mathematics, or children or adults playing for amusement or entertainment, shuffle and arrange a deck of cards C in a random sequence and deal such cards to the players, with the face of the card C bearing the information previously set forth concealed from view of the players. Alternatively, the cards are separated into groups in accordance with the types of mathematical operations, and the cards of each group are randomly arranged into a plurality of sets equal in number to the number of players, and dealt to the players so that each player has an equal number of cards for each type mathematical operation.

The first player, who may be chosen by a coin-flip or other suitable method, plays a first arithmetic card from the cards dealt to him by placing the card on a playing table with the information containing face shown in the drawings visible to the other players. Since no cards have been previously played, the value of his play is zero and no indicia appears in the window 35 of the first card played. If desired, the first player may be awarded a predetermined point score, for example 3, for his play, or he may be awarded no score, depending on the rules agreed upon by the players.

The second player then selects an arithmetic card C from those he has been dealt and plays his card by superimposing such card on the card C previously played. The value of the play, or the point score awarded to the second player, is determined in part by the value of the card played and is illustrated by the indicia of the previously played card visible through the aperture or window 35 in the card played by the second player. For example, an "Add One" card C-2 superimposed on the arithmetic card C-1, bearing an operator integer of one, gives a point score of two, since adding one to a previously played "one" card which has a value of one, equals two and is shown by an indicia of "two" on the card at the "Add One" region thereof, visible through the aperture 35b of the card C-2.

The third player superimposes a desired arithmetic card C from those in his hand and plays the card C by superimposing such card C, for example an "Add Six" card, on the card played by the second player, and determines the value of his play, or the point score he is to be awarded, by examining the indicia visible through the aperture 35, in this instance a point score of seven, since adding six to one gives a value of seven as shown by an indicia of seven on the card C-2 visible through the aperture 35 of the card C when such card C is superimposed on the card C-2.

Since the point score awarded is dependent in part on the card played by the preceding player, and since the play of a card with a high operator integer by one player enables the next subsequent player to create a high score utilizing such high operator integer, play of a particular card requires an analysis and determination of possible mathematical operations performable upon the operator integer of the card being played at a particular time, creating an entertaining, interesting and amusing game, while also training and teaching students in mental manipulation of integers in mathematical operations such as addition, multiplication, division, subtraction and the like.

Play of the game continues in the manner set forth above with each player in sequence choosing and playing a selected card and determining the value of his score by inspection of the indicia of the previously played card visible through the aperture 35 in the card he had played.

A suitable card holding tray into which the cards are inserted as they are played may be provided to insure that the aperture of the card played is properly superimposed upon the previously played card.

The winner of the game may be the player obtaining the highest score in a particular deal of the cards C, or the first player to attain a certain point total, or other suitable methods.

It should be understood that the number and value of the operator and operand integers set forth in the preferred embodiment is merely illustrative, and that numerous variations and adaptations of such integers in number and value as well as the mathematical operations performable thereon are suitable for use with the arithmetic cards and game of the present invention. Also, numerous variations in the dealing and playing sequence of such cards may be used in playing the game of the present invention. For example, the cards may be dealt and thereafter played by chance, with each player playing a card with the operation and integer of such card unknown to the players until such card is played.

Furthermore, the arithmetic cards of the present invention may be used as training aids for education purposes. A first arithmetic card specifying an operator integer and arithmetic operation as indicated at 30 and 30a is exhibited to the students, but having an indicia 40 specifying the result of such mathematical operation performed by such operator integer on an unknown integer visible to the student through the aperture 35.

The student must determine the operand integer based upon his knowledge of the operator integer, mathematical operation, and result. After the student has given his answer, removal of the card superimposed on the card to unknown contents allows the student to check his answer, since the unknown operand integer will be equal to the operator integer of the unknown card whose contents are now visible to the student.

The foregoing disclosure and description of the invention are illustrative and explanatory thereof, and various changes in the size, shape, and materials as well as in the details of the illustrated construction may be made without departing from the spirit of the invention.

I claim:

1. An arithmetic game played for education and entertainment, comprising:
   a plurality of arithmetic card means, each of said card means having a value specified by an operator integer and a mathematical operation, and further having a plurality of operand integers, and further being divided into a plurality of fields, each of said fields allocated respectively to one of said plurality of operand integers and said operator integer, and each of said fields being further divided into a plurality of regions, each of said regions allocated to a mathematical operation performable by the operator integer upon the operand integer allocated to said field ad containing indicia defining the result of such mathematical operation, and further including an aperture in the field of the mathematical operation of the region of said card allocated to such operator integer, whereby the players of the game sequentially superimpose a preselected one of said card means on the card means previously played and determine the value and score for the play by inspecting the indicia visible through the aperture in the preselected card most recently played.

2. The structure of claim 1, including:
   said card means having a region specifying an additive mathematical operation to be performed by the operator integer upon such operand integers and containing indicia defining the result of such operation in an addition field in said region of the card allocated to such operand integers.

3. The structure of claim 1, including:
   said card means having a region specifying a subtractive mathematical operation to be performed by the operator integer upon such operand integers and containing indicia defining the result of such operation in a subtraction field in said region of the card allocated to such operand integers.

4. The structure of claim 1, including:
said card means having a region specifying a multiplicative mathematical operation to be performed by the operator integer upon such operand integers and containing indicia defining the result of such operation in a field in the region of the card allocated to such operand integers.

5. The structure of claim 1, including:
each of said card means specifying a divisive mathematical operation to be performed by the operator integer upon such operand integers and containing indicia defining the result of such operation in a division field in the region of the card allocated to such operand integers.

* * * * *